United States Patent [19]
Yoshida et al.

[11] Patent Number: 5,361,245
[45] Date of Patent: Nov. 1, 1994

[54] OPTICAL SIGNAL PROCESSING APPARATUS FOR DETECTING THE DIRECTION OF MOVEMENT OF AN OPTICAL READING DEVICE RELATIVE TO AN OPTICAL DISK

[75] Inventors: Takaharu Yoshida; Naobumi Seo, both of Yokohama, Japan

[73] Assignee: Kabushiki Kaisha Toshiba, Kawasaki, Japan

[21] Appl. No.: 90,238

[22] Filed: Jul. 13, 1993

[30] Foreign Application Priority Data

Jul. 13, 1992 [JP] Japan .................. 4-185081

[51] Int. Cl.$^5$ .............................................. G11B 7/085
[52] U.S. Cl. .................. 369/44.28; 369/44.41; 369/44.34; 369/44.29; 369/44.35; 369/112
[58] Field of Search ............... 369/44.28, 44.29, 44.41, 369/44.42, 44.22, 44.34, 44.35, 44.36, 44.25, 54, 53, 58, 124, 112, 47, 48, 44.12

[56] References Cited

U.S. PATENT DOCUMENTS

| | | | |
|---|---|---|---|
| 4,819,220 | 4/1989 | Miyazaki et al. | 369/44.29 |
| 4,975,895 | 12/1990 | Yanagi | 369/44.29 |
| 5,038,333 | 8/1991 | Chow et al. | 369/44.29 |
| 5,097,458 | 3/1992 | Suzuki | 369/44.29 |
| 5,222,057 | 1/1993 | Suzuki et al. | 369/44.41 |

FOREIGN PATENT DOCUMENTS 214430 1/1990 Japan .

*Primary Examiner*—W. R. Young
*Assistant Examiner*—Muhammad N. Edun
*Attorney, Agent, or Firm*—Cushman, Darby & Cushman

[57] ABSTRACT

According to this invention, an optical signal processing apparatus for an optical disk has an actuator for moving an optical head in an radial direction of the optical disk, a plurality of first photodiodes for receiving a light beam reflected by the optical disk, an addition circuit for generating a first sum signal representing a sum of signals from the first photodiodes, a polarizing beam splitter for splitting the light beam reflected by the optical disk in accordance with directions of polarization, a plurality of second photodiodes for receiving light passing through the polarizing beam splitter, a subtraction circuit for generating a difference signal representing a difference between signals from the second photodiodes, and a circuit for determining a moving direction of the optical head, using the sum signal and the difference signal during a seek operation. Since the sum signal includes no data signal component, the moving direction of a light spot during a seek operation can be accurately determined, thereby performing a reliable seek operation.

6 Claims, 5 Drawing Sheets

F I G. 4A
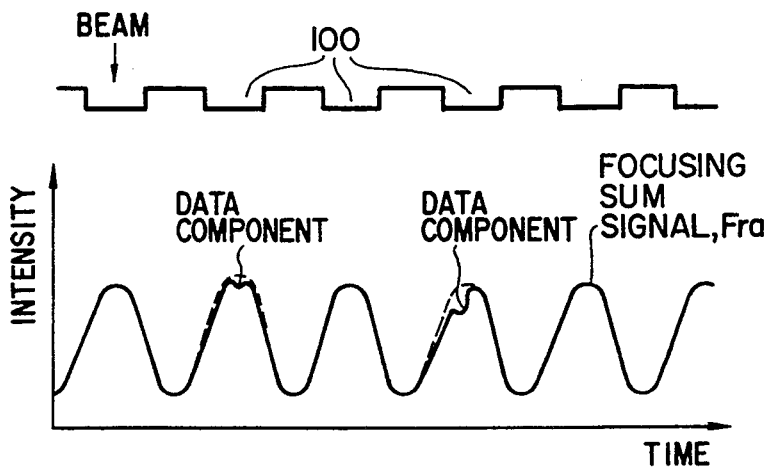
F I G. 4B
F I G. 4C
F I G. 5A
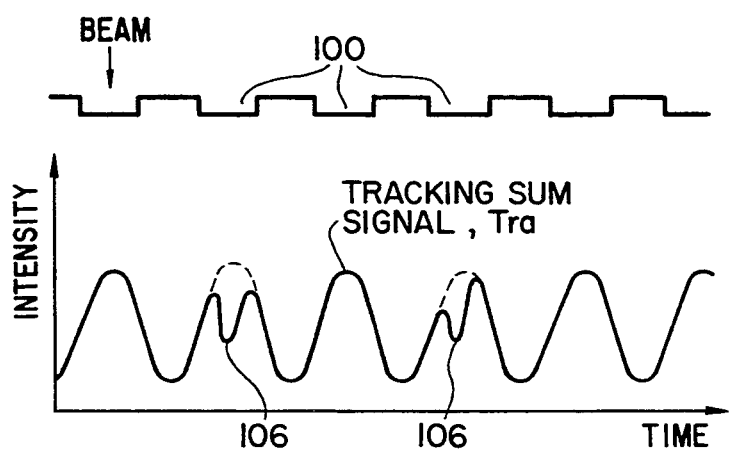
F I G. 5B
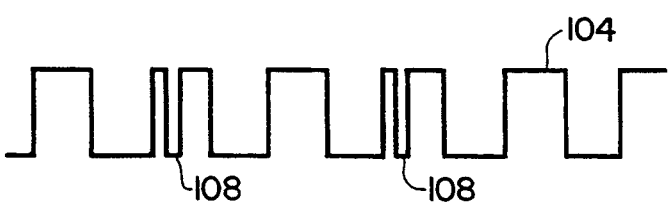
F I G. 5C F I G. 6A
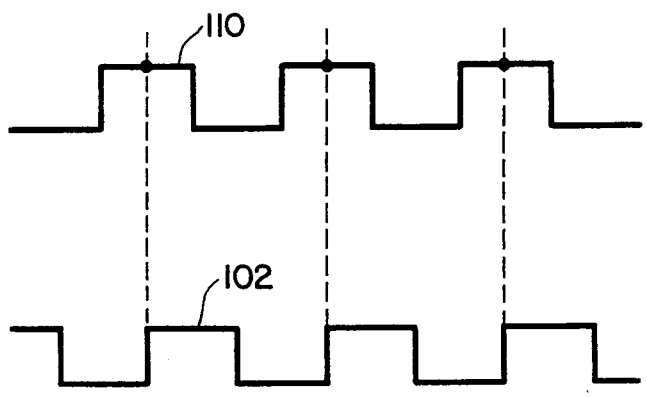
F I G. 6B
F I G. 7A
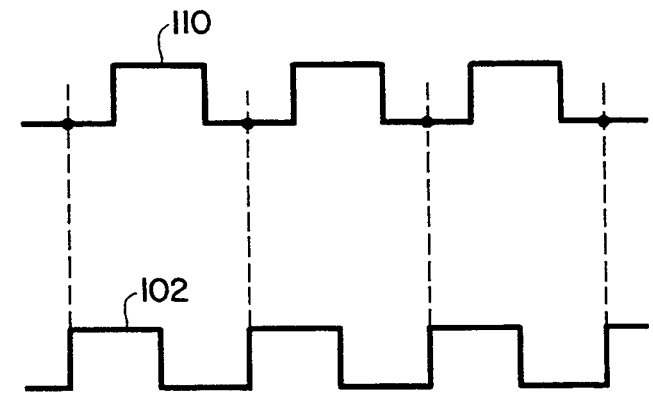
F I G. 7B

OPTICAL SIGNAL PROCESSING APPARATUS FOR DETECTING THE DIRECTION OF MOVEMENT OF AN OPTICAL READING DEVICE RELATIVE TO AN OPTICAL DISK

BACKGROUND OF THE INVENTION

1. Field of the Invention

The present invention relates to an optical signal processing apparatus such as a magneto-optic disk apparatus for reading data recorded in, e.g., a magneto-optic disk.

2. Description of the Related Art

An optical disk apparatus or a magneto-optic apparatus is known well as a recording medium signal processing apparatus using a recording medium (disk). In such an apparatus, physically recessed areas called pits, areas in which magnetic characteristics are changed, or areas in which the state of a metal is changed are formed on data tracks called concentric or spiral grooves on a disk, and data is written (recorded) or read out (reproduced) by using these areas.

In a conventional apparatus in which data is recorded/reproduced along recording tracks, an optical head is controlled to form a light spot on a track. When data in a target track distant from a current position of the optical head is to be written or read, the optical head is moved to access the target track. This operation for accessing a track is called a seek operation.

In the seek operation, as disclosed in Published Unexamined Japanese Patent Application No. 2-14430, when a head carriage assembly having an optical head is moved in the radial direction of the disk while the speed of the head is controlled, a light spot from the optical head traverses recording tracks to quickly move to a target track.

Although the speed of the optical head must be detected to control the speed, in this case, the speed is detected as follows. A beam reflected by the optical disk is received by a four-divided photodiode for generating a tracking control signal. Electrical signals generated from the photodiode are added in adders and a difference between two signals from the adders is detected. A difference signal representing the difference is binarized by using a predetermined threshold level. A period of the binary signal is counted using a predetermined clock, and the reciprocal of the number of the count result is calculated, thereby detecting the speed of the optical head.

In order to cause the light spot to traverse recording tracks to quickly and reliably reach a target track, the moving direction (the direction from the inside to the outside of the disk or vice versa) of the optical head must also be detected during the control operation of the speed. A reason for this will be described below.

For example, when the light spot is moved from the inside to the outside of a rotating disk, and when the grooves on the disk is shifted in the same direction of the light spot at a speed higher than that of the light spot due to the eccentricity of the disk or the like, the traversing speed of the light spot relative to the grooves is temporarily reversed. That is, the moving direction of the light spot is reversed due to the eccentricity of the disk.

Therefore, in an apparatus using a disk having inevitable eccentricity to some extent, the moving direction of the optical spot must be quickly and reliably determined. This determination is a necessary condition for the head speed control operation.

The direction of the light spot is detected from the two signals generated from the adders. The direction is detected by binarizing the difference signal (to be referred to as a tracking difference signal) representing a difference between the two signals and a sum signal (to be referred to as a tracking sum signal) representing a sum of the two signals, and using a phase difference between the binarized difference signal and sum signal.

The signal level of the binary difference signal is held at a timing of the leading edge of the binary sum signal obtained while the optical head is moved, and the moving direction of the optical spot is determined by the level of the held signal. That is, when the held signal is at a high level, the light spot is moved from the outside to the inside of the disk; and when the signal is at a low level, the light spot is moved from the inside to the outside.

As described above, the speed is detected by using the tracking difference signal, and the direction is detected in accordance with the phase difference between the sum signal and the difference signal. Therefore, the speed can be accurately controlled, and a high-speed seek operation on the basis of a remaining track count to a target track can be realized.

When the optical head is moved over tracks in which data are written, a data signal is superposed on a tracking signal. For this reason, an accurate binary signal may not be obtained. Conventionally, the data signal in the tracking sum signal used in a seek operation is neglected. In this case, an accurate relative moving direction between the tracks on the disk and the light spot traversing the tracks cannot be detected, and the speed of the light spot cannot be easily controlled.

SUMMARY OF THE INVENTION

It is an object of the present invention to provide an optical disk apparatus capable of accurately and reliably detecting the speed of a light spot, i.e., a relative speed between an optical head carriage and an optical disk and the moving direction of the light spot without being influenced by data written in the disk.

In order to achieve the above object, according to the present invention, there is provided an optical disk apparatus including means for radiating a light beam on the optical disk, means for moving the radiating means in a radial direction of the optical disk, a plurality of first light-receiving means for receiving a light beam reflected by the optical disk to generate an electrical signal corresponding to the received light beam, first sum signal generating means for generating a first sum signal representing a sum of signals from the plurality of first light-receiving means, means for splitting a light beam reflected by the optical disk in accordance with directions of polarization of the light beam, a plurality of second light-receiving means for receiving light passing through the splitting means to generate an electrical signal corresponding to the received light, means for generating a difference signal representing a difference between signals from the plurality of second light-receiving means, and means for determining a moving direction of the radiating means by using the sum signal and the difference signal when the radiating means is moved by the moving means in the radial direction of the optical disk.

Since the sum signal includes no data signal component, the moving direction of the light spot during a seek operation can be accurately determined, and, therefore, a reliable seek operation can be performed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

FIG. 4A is a view showing grooves formed on the disk, FIG. 4B is a timing chart showing a focusing sum signal corresponding to the grooves in FIG. 4A, and FIG. 4C is a timing chart showing a binary focusing sum signal, the above signals being used in a seek operation;

FIG. 5A is a view showing grooves formed on a disk, FIG. 5B is a timing chart showing a tracking sum signal corresponding to the grooves in FIG. 5A, and FIG. 5C is a timing chart showing a binary tracking sum signal, the above signals being used in a conventional seek operation;

FIG. 6A is a timing chart showing a binary tracking difference signal, and FIG. 6B is a timing chart showing a binary focusing sum signal, these charts being to explain a direction detecting operation in which the light spot is moved inward on the disk; and FIG. 7A is a timing chart showing a binary tracking difference signal, and FIG. 7B is a timing chart showing a binary focusing sum signal, these charts being to explain a direction determining operation in which the light spot is moved outward on the disk.

DETAILED DESCRIPTION OF THE PREFERRED EMBODIMENT

An embodiment of the present invention will be described below with reference to the accompanying drawings.

Figure 1:
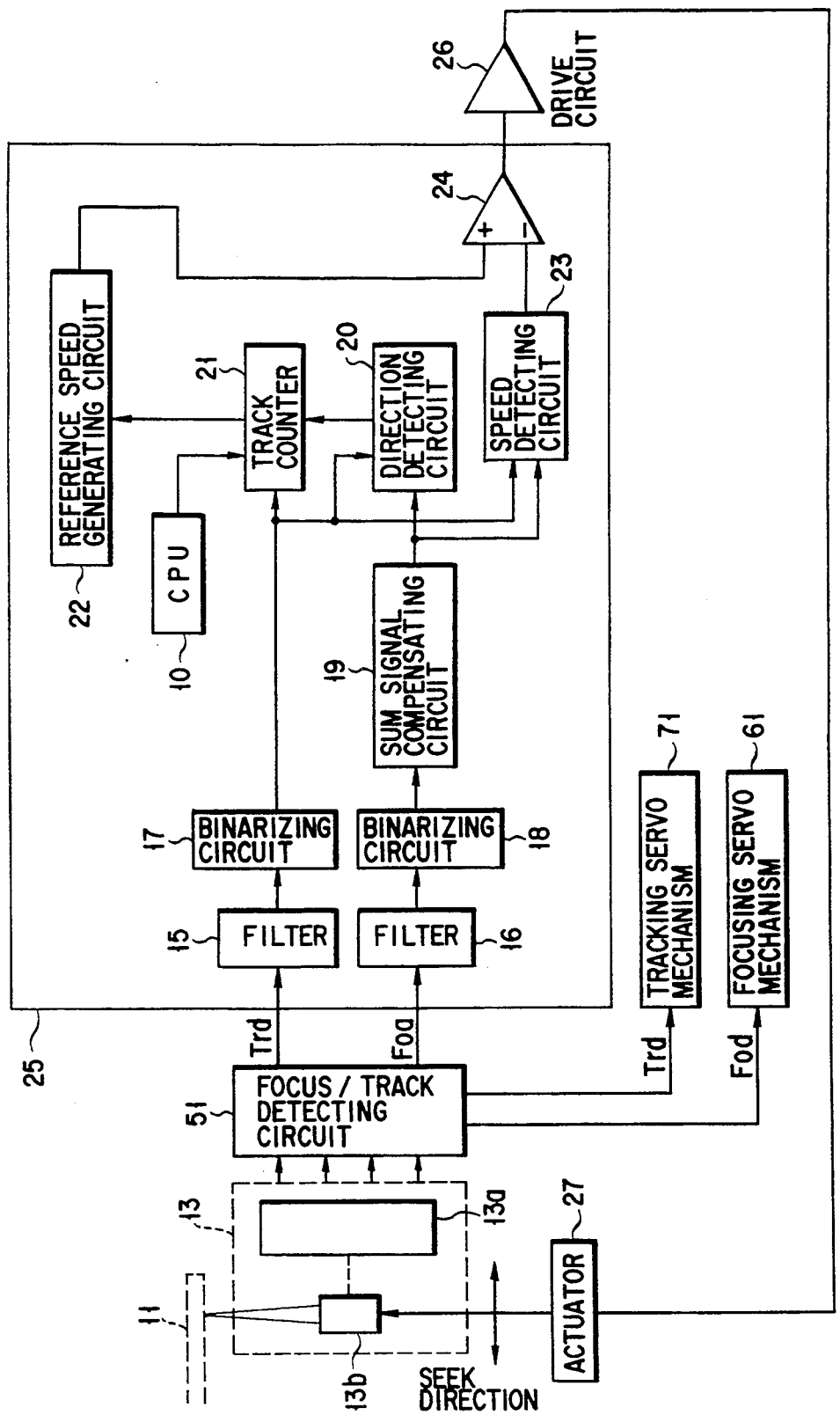
FIG. 1 is a block diagram schematically showing the arrangement of a magneto-optic disk apparatus according to an embodiment of the present invention.

FIG. 1 schematically shows the main part of the arrangement of an optical disk apparatus according to the present invention. A disk 11 is, e.g., a magneto-optic (MO) disk, and the disk 11 is rotated at a constant angular velocity or a constant linear velocity by a speed-controlled spindle motor (not shown). Data tracks called grooves are spirally or concentrically formed on the disk 11. A plurality of sector marks (header data) are recorded at predetermined intervals in the data tracks. Each of the sector marks is constituted by a combination of a plurality of physical pits (emboss bits) and indicates, e.g., the address (a track number or a sector number) of a data recording area following the sector mark.

An optical head 13 radiates a laser beam on the disk 11, and the laser beam is focused on the disk 11 as a light spot. The laser beam is a polarized light beam having a first direction of polarization aligned along a predetermined angular orientation with respect to the optical axis. With the light spot, data can be written in a predetermined track on the disk 11 or read out from the predetermined track.

A movable portion 13b of the optical head 13 is driven by an actuator 27 of a head carriage assembly, and the movable portion 13b is moved in the directions (the radial directions of the disk 11, i.e., directions to cross the tracks on the disk) of an arrow in FIG. 1 during a seek operation of a track. That is, the light spot from the optical head 13 is accessed to a target track by driving the actuator 27.

Figure 2:
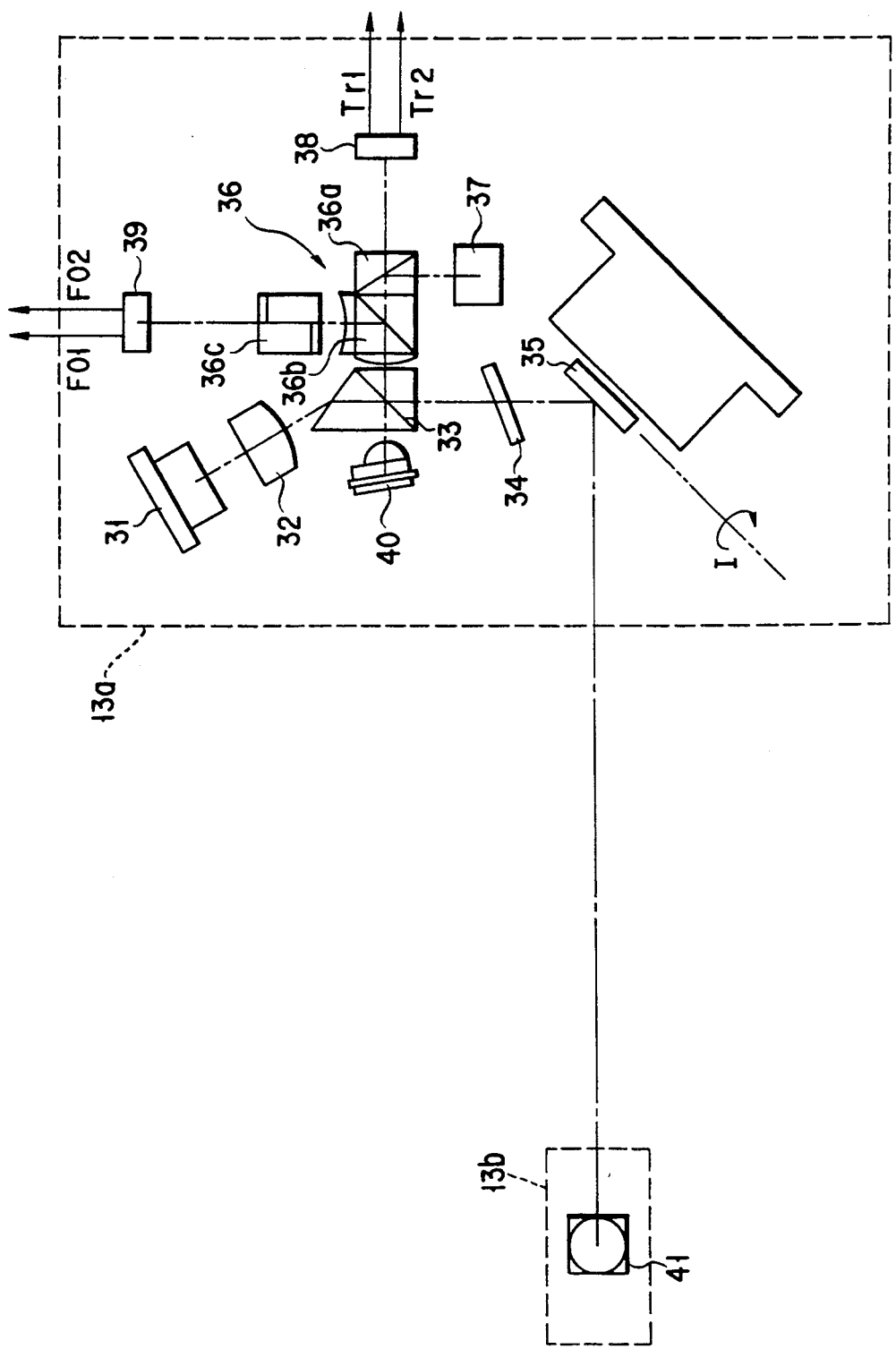
FIG. 2 is a schematic view showing the arrangement of an optical head in FIG. 1.

The optical head 13 has a plurality of photodiodes, and a laser beam reflected by the disk 11 is detected by the photodiodes. As shown in FIG. 2, the optical head 13 comprises a fixed portion 13a, the movable portion 13b, and the like. The fixed portion 13a includes a light source, i.e., a semiconductor laser 31, a collimator lens 32, a beam splitter 33, a beam shift correction plate 34, a galvano mirror (rotary mirror) 35, a detection optical system 36, a photodiode 37, a two-divided photodiode 38, a four-divided photodiode 39, an APC detector 40, and the like. The movable portion 13b incorporates a rising mirror 41.

With the above arrangement, a light beam from the semiconductor laser 31 is converted into a parallel beam by the collimator lens 32, and is incident on the beam splitter 33. The light beam having an elliptic section is converted into a light beam having a circular section by a prism arranged on the incident side of the beam splitter 33.

The light beam passing through the beam splitter 33 passes through the beam shift correction plate 34 and is reflected by the galvano mirror 35 rotated on an axis in the direction of an arrow I.

The light beam reflected by the galvano mirror 35 is incident on the movable portion 13b and reflected by the rising mirror 41 arranged inside the optical head 13. The parallel light beam is focused as a light spot on the disk surface of the disk 11 by an objective lens (not shown).

A divergent light beam reflected by the disk 11 has a second direction of polarization different from the first direction of polarization, and is converted by the objective lens into a parallel light beam, reflected by the rising mirror 41, and returned again to the beam splitter 33 through the galvano mirror 35 and the beam shift correction plate 34.

The light beam reflected by the disk 11 and introduced to the beam splitter 33 is split by the detection optical system 36 including a focus detection optical system, and the split beams are detected by the photodiode 37, 38, and 39. The detection optical system 36 is constituted by a polarizing beam splitter 36a, a non-polarizing beam splitter 36b, and an optical element 36c constituting the focus detection optical system.

A light beam reflected by the non-polarizing beam splitter 36b passes through the optical element 36c and is detected by the four-divided photodiode 39. When detection signals $F_{o1}$ and $F_{o2}$ from the four-divided photodiode 39 are processed in a focus/track detection circuit 51 in FIG. 1, a focusing control signal (to be referred to as a focusing difference signal) $F_{od}$ is generated. That is, since the detection signals $F_{o1}$ and $F_{o2}$ from the four-divided photodiode 39 are obtained from a beam which does not pass through the polarizing beam splitter 36a, the detection signals $F_{o1}$ and $F_{o2}$ do not include data components on the disk 11.

The beam passing through the non-polarizing beam splitter 36b passes through the polarizing beam splitter 36a and is detected by the two-divided photodiode 38. Detection signals $T_{r1}$ and $T_{r2}$ from the two-divided photodiode 38 are processed by the focus/track detection circuit 51 in FIG. 1 to generate a tracking difference signal $T_{rd}$ which is referred to as deviation signal representing a deviation between the light beam radiated onto the optical disk and the track. That is, since the detection signals $T_{r1}$ and $T_{r2}$ from the two-divided photodiode 38 are obtained from a beam passing through the polarizing beam splitter 36a, the detection signals $T_{r1}$ and $T_{r2}$ include data components on the disk 11.

In addition, when the signal from the two-divided photodiode 38 and the signal obtained from a beam passing through the non-polarizing beam splitter 36b, reflected by the polarizing beam splitter 36a, and detected by the photodiode 37 are processed, data recorded in the disk 11 is reproduced.

In data recording and reproduction, a focusing servo mechanism 61 is driven in response to the focusing control signal $F_{od}$ from the focus/track detection circuit 51. In this manner, the objective lens is moved along the optical axis and kept in a focused state. As a result, the light beam from the objective lens forms a minimum beam spot on the disk 11.

Similarly, a tracking servo mechanism 71 is driven in response to the track signal $T_{rd}$ from the focus/track detection circuit 51. In this manner, the objective lens is kept in an in-tracking state. As a result, a convergent light beam from the objective lens traces a desired track on the disk 11.

Figure 3:
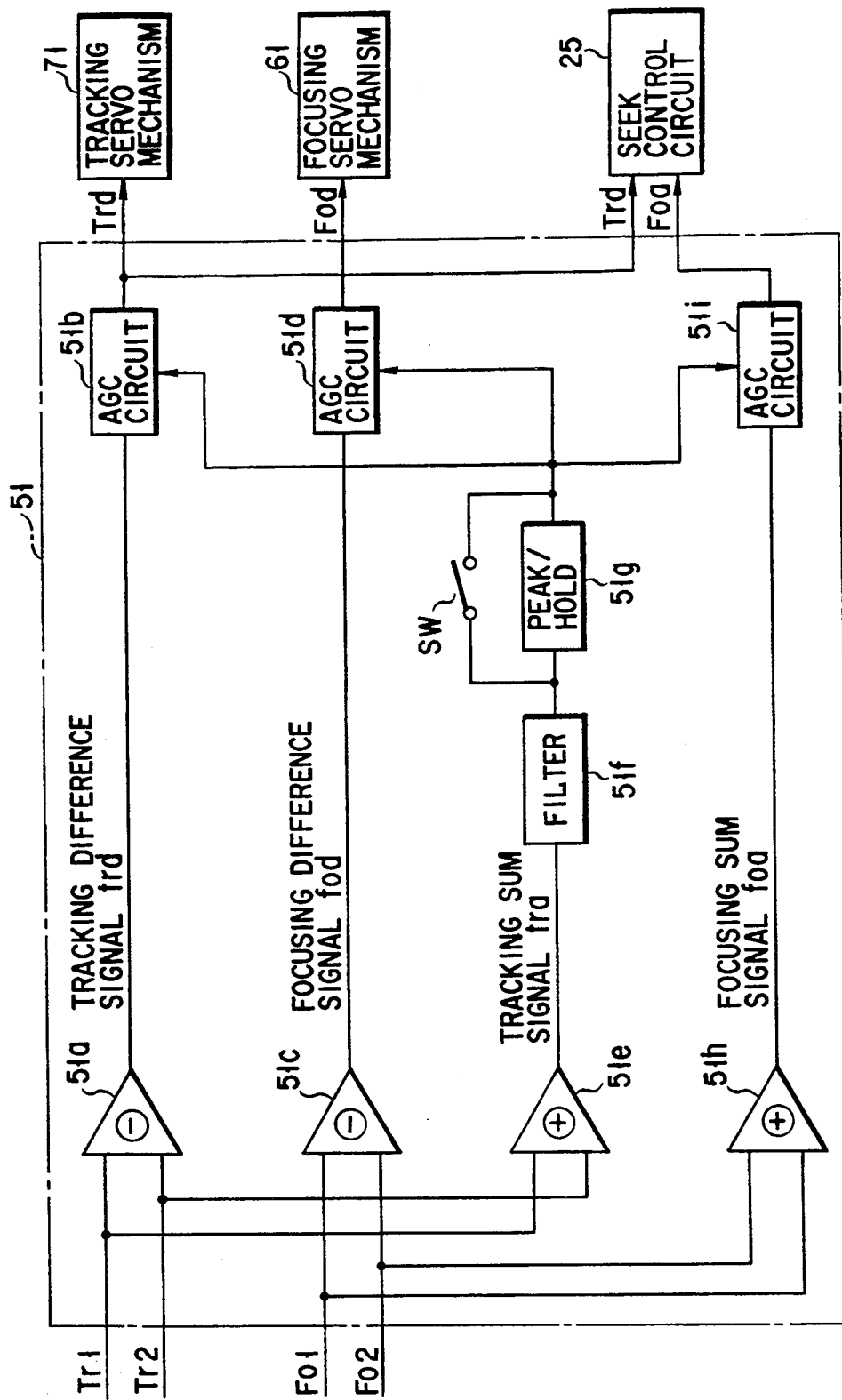
FIG. 3 is a block diagram showing the arrangement of a focus/track detection circuit in FIG. 1.

FIG. 3 shows the arrangement of the focus/track detection circuit 51 in FIG. 1.

The focus/track detection circuit 51 generates the tracking difference signal $T_{rd}$ used in the focusing servo mechanism 61 and a seek control circuit 25, the focusing difference signal $F_{od}$ used in the focusing servo mechanism 61, and a focusing sum signal $F_{oa}$ used in the seek control circuit 25 from the detection signals $T_{r1}$, $T_{r2}$, $F_{o1}$, and $F_{o2}$.

A difference between the detection signals $T_{r1}$ and $T_{r2}$ is output by a subtracter 51a to obtain a tracking difference signal $t_{rd}$. The tracking difference signal $t_{rd}$ is normalized by an AGC circuit 51b to generate the tracking difference signal $T_{rd}$. A difference between the detection signals $F_{o1}$ and $F_{o2}$ is output by a subtracter 51c to obtain a focusing difference signal $f_{od}$. The focusing difference signal $f_{od}$ is normalized by an AGC circuit 51d to generate the focusing control signal $F_{od}$. The detection signals $T_{r1}$ and $T_{r2}$ are added to each other by an adder 51e to obtain a tracking sum signal $t_{ra}$. The tracking sum signal $t_{ra}$ is filtered by a filter 51f, peak-held by a peak hold circuit 51g in a seek operation, and input to the AGC circuits 51b, 51d, and 51i. The detection signals $F_{o1}$ and $F_{o2}$ are added to each other by an adder 51h to obtain a focusing sum signal $f_{oa}$. The focusing sum signal is normalized by the AGC circuit 51i to form the focusing sum signal $F_{oa}$.

The amplitude of the tracking difference signal and the amplitude of the focusing difference and sum signals are decreased due to the reflection characteristics of the disk 11 and variations in the four-divided photodiode 39 and the two-divided photodiode 38, and a binary signal cannot be accurately generated. To prevent to this, in reading out and writing (or erasing) data, a switch SW is closed, the focusing difference signal $f_{od}$ and the tracking difference signal $t_{rd}$ are divided by the tracking sum signal $t_{ra}$ to obtain the normalized signals $F_{od}$ and $T_{rd}$, and the signals $F_{od}$ and $T_{rd}$ are used in tracking control and focusing control. In a seek operation, the switch SW is closed, and each signal is normalized at a peak value of the tracking sum signal to assure a predetermined amplitude.

As shown in FIG. 1, a track seeking operation, i.e., access to a target track, is performed using the tracking difference signal $T_{rd}$ and the focusing sum signal $F_{oa}$ from the focus/track detection circuit 51 by a feedback loop control system constituted by a circuit element 26, the circuit element 27, and the seek control circuit 25 including circuit elements 15 to 24.

That is, the tracking difference signal $T_{rd}$ and the focusing sum signal $F_{oa}$ from the focus/track detection circuit 51 are filtered by filters 15 and 16, respectively, to remove high-frequency noise from these signals.

The filtered difference and sum signals are binarized by binarizing circuits 17 and 18, respectively. The binarization is performed using, e.g., an intermediate level between the maximum and minimum values of an input signal level as a threshold value.

FIG. 4A shows grooves 100 on the disk, FIG. 4B shows the focusing sum signal $F_{oa}$ corresponding to the grooves, and FIG. 4C shows a binary focusing sum signal 102 obtained by binarizing the sum signal. As described above, the focusing sum signal $F_{oa}$ is generated on the basis of the detection signals $F_{o1}$ and $F_{o2}$ obtained by causing a reflected beam, which does not pass through the polarizing beam splitter, 36a to be incident on the four-divided photodiode 39. For this reason, as shown in FIG. 4B, a data signal component written in the disk 11 is rarely superposed on the focusing sum signal. Therefore, as shown in FIG. 4C, the binary sum signal includes no data signal component, and therefore, a binary sum signal having an ideal waveform can be obtained.

FIGS. 5A, 5B, and 5C are views corresponding to FIGS. 4A, 4B, and 4C. FIG. 5A shows grooves 100 on the disk 11, FIG. 5B shows a tracking sum signal $T_{ra}$ conventionally used in a seek operation, and FIG. 5C shows a binary tracking sum signal 104 obtained by binarizing the sum signal $T_{ra}$. As described above, the tracking sum signal $T_{ra}$ is generated by using the signals $T_{r1}$ and $T_{r2}$ obtained by causing a beam reflected by the disk 11 to be incident on the two-divided photodiode 38 through the polarizing beam splitter 36a. These signals $T_{r1}$ and $T_{r2}$ include data signal components. Therefore, as shown in FIG. 5B, the tracking sum signal includes data signal components 106. As a result, as shown in FIG. 5C, when the tracking sum signal is binarized, the data components are superposed on the binary tracking sum signal 104, as illustrated in FIG. 5C by the changes in state 108. For this reason, the grooves cannot be accurately detected by the binary tracking sum signal.

Referring back to FIG. 1, the binary difference signal binarized by the binarizing circuit 17 is input to a direction detection circuit 20, a track counter 21, and a speed detection circuit 23. The binary sum signal binarized by the binarizing circuit 18 is input to a sum signal compensating circuit 19.

The sum signal compensating circuit 19 wave-shapes the binary focusing sum signal to remove noise remaining in the binary sum signal. The binary sum signal compensated by the sum signal compensating circuit 19 is input to the direction detection circuit 20 and the speed detection circuit 23.

Data representing the number of tracks to be traversed (crossed) between a track at which a light spot is currently positioned and a target track is preset in the track counter 21 by a CPU 10 before a seek operation is started. For example, when the target track is a track positioned outside the current track, a positive value is preset; and when the target track is a track positioned inside the current track, a negative value is preset. The track counter 21 receives a one-shot binary difference pulse signal from the binarizing circuit 17 each time the optical head 13 is moved to cause the light spot to traverse one track on the disk 11.

The direction detecting circuit 20 detects the moving direction of the moving optical head 13. For example, when the optical head 1B is moved outward, the direction detecting circuit 20 outputs a low-level signal; and when the optical head 13 is moved inward, the direction detecting circuit 20 outputs a high-level signal. When the direction detection circuit 20 outputs the low-level signal, the track counter 21 performs a count-down operation of a preset value using an output from the binarizing circuit 17. When the direction detection circuit 20 outputs the high-level signal, the track counter 21 performs a count-up operation of the preset value. In this case, as the light spot approaches the target track, the absolute value of the count value of the counter 21 is decreased. When the light spot reaches the target track, the count value becomes "0".

The direction detecting circuit 20 performs the following operation to detect a track seek direction of the optical head 13. That is, when the light spot is moved from the outside to the inside of the disk 11, as shown in FIGS. 6A and 6B, the direction detecting circuit 20 samples/holds the signal level of the binary tracking difference signal 100 at the leading edge of the binary focusing sum signal 102 to generate a high-level signal. When the light spot is moved from the inside to the outside of the disk 11, as shown in FIGS. 7A and 7B, the direction detection circuit 20 samples/holds the signal level of the binary tracking difference signal 110 at the leading edge of the binary focusing sum signal 102 to generate a low-level signal. In this manner, the direction detection circuit 20 outputs a signal having a logic level which is changed depending on the directions (seek directions) of the movement of the light spot, and an output from the directing detecting circuit 20 is supplied to the up-count/down-count designation input terminal of the track counter 21.

For example, it is assumed that the optical head 13 will be moved to an outer track of the disk 11. The CPU 10 presents a positive value in the track counter 21. The preset value of the counter 21 is input to the reference speed signal generator 22, and an analog value corresponding to the preset value is output to the differential amplifier 24. As a result, the actuator 27 moves the optical head 13 outward on the disk 11 at high speed. The direction detecting circuit 20 detects the direction of the movement of the optical head 13 to output a low-level signal, and the track counter 21 performs a count-down operation of the preset value using a pulse output from the binarizing circuit 17. While the optical head 13 is moved outward on the disk 11, if a relative speed is reversed as described in the prior art due to the eccentricity of the disk 11, the direction detecting circuit 20 outputs a high-level signal in this period. As a result, the track counter 21 performs a count-up operation of the remaining track count in the period so as to correct the count value. When the count correction operation is performed, a correct cross track count can be detected regardless of the presence/absence of the eccentricity of the disk 11.

The track counter output is input to the reference speed signal generator 22 as described above. The reference speed signal generator 22 generates reference speed data corresponding to a remaining track count to a target track. Therefore, when the current light spot is considerably distant from the target track, i.e., when the remaining track count to a target track is large, the reference speed signal generator 22 generates a high reference speed and a reference speed which is gradually decreased as the light spot approaches the target track.

The speed detecting circuit 23 supplies a signal to the differential amplifier 24 on the basis of a binary difference signal from the binarizing circuit 17 and a sum signal from the sum signal compensating circuit 19. The supplied signal represents the speed of the light spot which is moved at present.

The differential amplifier 24 generates a signal proportional to a difference between a reference value from the reference speed signal generator 22 and a detection value from the speed detecting circuit 23, and this signal is supplied to the drive circuit 26.

The drive circuit 26 drives the actuator 27 in response to the signal from the differential amplifier 24, thereby moving the optical head 13. As a result, the speed of the optical head 13 is controlled such that the light spot is moved at a speed to minimize the difference between the reference value and the detection value.

That is, under the control of the speed, a seek operation is performed at a high reference speed when a remaining track count to a target track is large, and the reference speed is decreased as the remaining track count is decreased, thereby decreasing a seek speed.

As described above, according to the present invention, a binary focusing sum signal is generated on the basis of a focusing sum signal on which a data signal written in a disk is not easily superposed, and a seek operation is controlled using the binary focusing sum signal. Therefore, a track can be more accurately detected when the focusing sum signal is used as compared with use of a tracking sum signal. That is, the moving speed and direction of the light spot can be more accurately detected regardless of the influence of written data.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An optical disk apparatus for accessing a target track of an optical disk on which tracks are formed and information is recorded along the track, comprising.

means for radiating a polarized light beam onto the optical disk, the polarized light beam having a first direction of polarization aligned along a predetermined angular orientation with respect to an optical axis of the radiating means, the radiating means being movable toward the target track along a radial direction of the optical disk;

a non-polarizing beam splitter for splitting a light beam reflected off of the optical disk into a first reflected light beam and a second reflected light beam, wherein the light beam reflected off of the disc has a second direction of polarization that is different from the first direction of polarization, the first reflected light beam and the second reflected light beam both being polarized in the second direction of polarization;

a polarizing beam splitter for splitting the first reflected light beam into a third reflected light beam, wherein the third reflected light beam has a third direction of polarization;

first receiving means for receiving the second reflected light beam split by the non-polarizing beam splitter to generate an electrical signal corresponding to the second reflected light beam;

second receiving means for receiving the third reflected light beam split by the polarizing beam splitter to generate a deviation signal corresponding to the third reflected light beam, the deviation signal representing a deviation between the light beam radiated onto the optical disk and the location of the track on the optical disk;

means for detecting a relative direction of radial movement the radiating means over the disk based on the electrical signal from the first receiving means and the deviation signal from the second receiving means while the radiating means is being moved and for providing a detecting result; and means for driving the radiating means in response to the detecting result of the detecting means.

2. An apparatus according to claim 1, wherein the second receiving means is a photo-diode having at least two segments, said apparatus further comprising:

means for generating a sum signal representing a sum of the third reflected light beam as provided from the at least two segments of the second receiving means;

means for holding a peak of an output from the sum signal generating means when the radiating means moves in the radial direction, thereby providing an output corresponding to the held peak;

means for adjusting an amplitude of the deviation signal from the second receiving means using the output of the peak holding means to output an adjusted deviation signal to the direction detecting means; and means for adjusting an amplitude of the signal generated from the first receiving means to output an adjusted signal corresponding to the second reflected light beam provided to the direction detecting means.

3. An apparatus according to claim 1, further comprising:

means for counting the number of tracks to be crossed by the radiating means, wherein a count direction of the counting means is determined from the output rom the direction detecting means, and a count value of the counting means is changed based on the deviation signal;

means for generating a reference speed of the radiating means using an output from the counting means;

means for detecting a speed of the radiating means, which is moved, using the signal from the first receiving means and the deviation signal; and means for generating a signal proportional to a difference between outputs from the reference speed generating means and the speed detecting means to output the signal to the radiating means.

4. An optical disk apparatus for accessing a target track of an optical disk on which tracks are formed and information is recorded along the track, comprising:

an optical head for radiating a polarized beam on the optical disk to generate a reflected beam off of the optical disk, the polarized beam having a first direction of polarization aligned along a predetermined angular orientation with respect to the optical axis of the polarized beam, the reflected light beam having a second direction of polarization different from the first direction of polarization;

a non-polarizing beam splitter for splitting the reflected light beam reflected off of the optical disk into a first light beam and a second light beam;

a photodiode for receiving the first light beam to generate an electrical signal corresponding to the first light beam;

a first binarizing circuit for generating a first binarizing signal corresponding to the electrical signal, the first binarizing signal having a leading edge;

a polarizing beam splitter for splitting the second light beam into a split light beam having a third direction of polarization;

a two-divided photodiode for receiving the split light beam split by the polarizing beam splitter to generate deviation signals individually corresponding to the split light beam, the deviation signal representing a deviation between the light beam radiated onto the optical disk and a track formed on the disk;

a subtraction circuit for generating a difference signal representing a difference between the deviation signals from two-divided photodiode;

a second binarizing circuit for generating a second binarizing signal corresponding to the difference signal, an actuator for moving the optical head toward the target track in a radial direction across the tracks of the optical disk;

a direction detecting circuit for detecting a moving direction of the optical head based on a level of the second binarizing signal sampled at the leading edge of the first binarizing signal while the optical head is moved by the actuator; and a drive circuit for driving the actuator in response to the detecting result of the detecting circuit.

5. An apparatus according to claim 4, further comprising:

an addition circuit for generating a sum signal representing a sum of signals from the two-divided photodiodes;

a circuit for holding a peak of an output from the addition circuit when the optical head is moved by the actuator in the radial direction across the tracks, thereby providing an output having the held peak;

a first AGC circuit for adjusting an amplitude of the difference signal from the subtraction circuit using the output having the held peak to output an adjusted difference signal to the direction detecting circuit; and a second AGC circuit for adjusting an amplitude of the electrical signal corresponding to the first light beam using the output having the held peak to output an adjusted electrical signal to the direction detecting means.

6. An apparatus according to claim 4, further comprising:

a counter in which an initial value of the number of tracks to be crossed by the optical head is set, wherein a count direction of the counter is determined in accordance with the direction detecting means, and a count value of the counter is changed based on the second binarizing signal;

optimal speed generating means for generating an optimal speed of the optical head using an output from the counter;

speed detecting means for detecting a speed of the optical head, which is moved, using the first binarizing signal and the second binarizing signal; and means for generating a signal proportional to a difference between outputs from the speed detecting means to output the signal to the speed detecting means to output the signal to the actuator.

* * * * *